United States Patent
Biagiotti

(10) Patent No.: US 10,737,456 B2
(45) Date of Patent: Aug. 11, 2020

(54) PRESSING ROLLER FOR THE PROCESSING OF WEB PAPER MATERIAL

(71) Applicant: Guglielmo Biagiotti, Capannori (IT)

(72) Inventor: Guglielmo Biagiotti, Capannori (IT)

( * ) Notice: Subject to any disclaimer, the term of this patent is extended or adjusted under 35 U.S.C. 154(b) by 125 days.

(21) Appl. No.: 16/096,244

(22) PCT Filed: Apr. 3, 2017

(86) PCT No.: PCT/IB2017/051885
§ 371 (c)(1),
(2) Date: Oct. 24, 2018

(87) PCT Pub. No.: WO2017/187285
PCT Pub. Date: Nov. 2, 2017

(65) Prior Publication Data
US 2019/0160777 A1  May 30, 2019

(30) Foreign Application Priority Data

Apr. 26, 2016  (IT) .................. 102016000042297

(51) Int. Cl.
*B31F 1/00* (2006.01)
*B32B 29/00* (2006.01)
(Continued)

(52) U.S. Cl.
CPC .............. *B31F 1/07* (2013.01); *B32B 29/005* (2013.01); *B32B 37/12* (2013.01); *B32B 38/06* (2013.01); *B31F 2201/0725* (2013.01); *B31F 2201/0728* (2013.01); *B31F 2201/0764* (2013.01); *B32B 2432/00* (2013.01)

(58) Field of Classification Search
CPC ... B31F 1/00; B31F 1/07; B32B 29/00; B32B 29/005; B32B 37/00; B32B 37/10; B32B 37/12; B32B 38/00; B32B 38/06
See application file for complete search history.

(56) References Cited

U.S. PATENT DOCUMENTS 4,158,128 A * 6/1979 Evdokimov ............ D21F 5/027
165/50

FOREIGN PATENT DOCUMENTS

| EP | 2803610 | 11/2014 |
| EP | 2974857 | * 1/2016 |

(Continued)

OTHER PUBLICATIONS

International Search Report dated Jul. 27, 2017.
(Continued)

*Primary Examiner* — Jacob T Minskey
*Assistant Examiner* — Matthew Hoover
(74) *Attorney, Agent, or Firm* — Preston Smirman; Smirman IP Law, PLLC

(57) ABSTRACT

A pressing roller (10) for the processing of web paper material, in particular of the type used in cooperation with an engraving roller (G1) for the bonding of two or more embossed plies of web paper material, comprises a cylindrical pressure surface (11) defined by a plurality of annular resilient pressure bodies (15) of rubber material that have a high surface hardness which allows to avoid the effect of "double embossing" and at the same time have a high elastic yielding which allows to obtain adequate nip also with relatively low contact pressures.

7 Claims, 4 Drawing Sheets

(51) Int. Cl.
  *B32B 37/00* (2006.01)
  *B32B 38/00* (2006.01)
  *B31F 1/07* (2006.01)
  *B32B 37/12* (2006.01)
  *B32B 38/06* (2006.01)

(56) References Cited

FOREIGN PATENT DOCUMENTS

| | | | |
|---|---|---|---|
| GB | 1205097 | * | 11/1968 |
| GB | 1205097 | | 9/1970 |

OTHER PUBLICATIONS

International Preliminary Report on Patentability dated Oct. 30, 2018.
Written Opinion of the International Searching Authority dated Jul. 27, 2017.
English Abstract of EP 2803610.

* cited by examiner

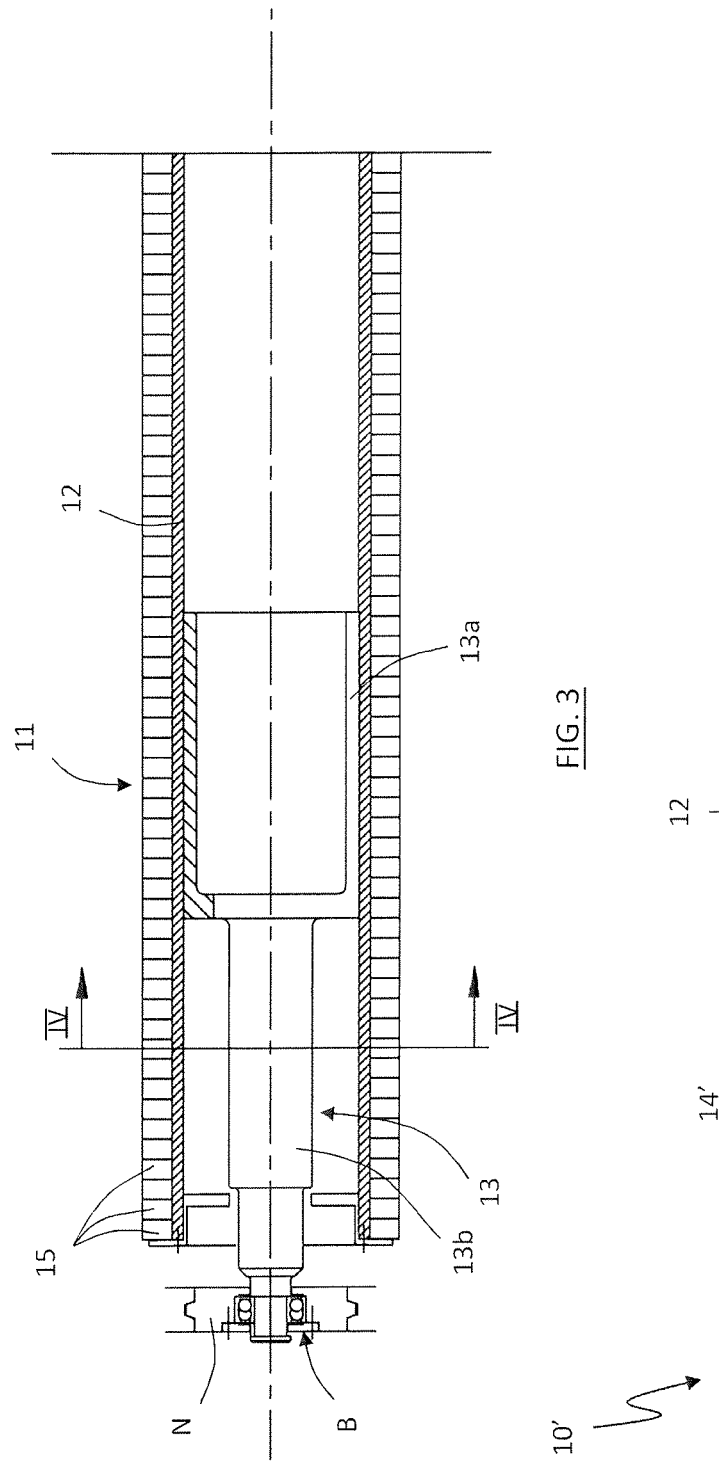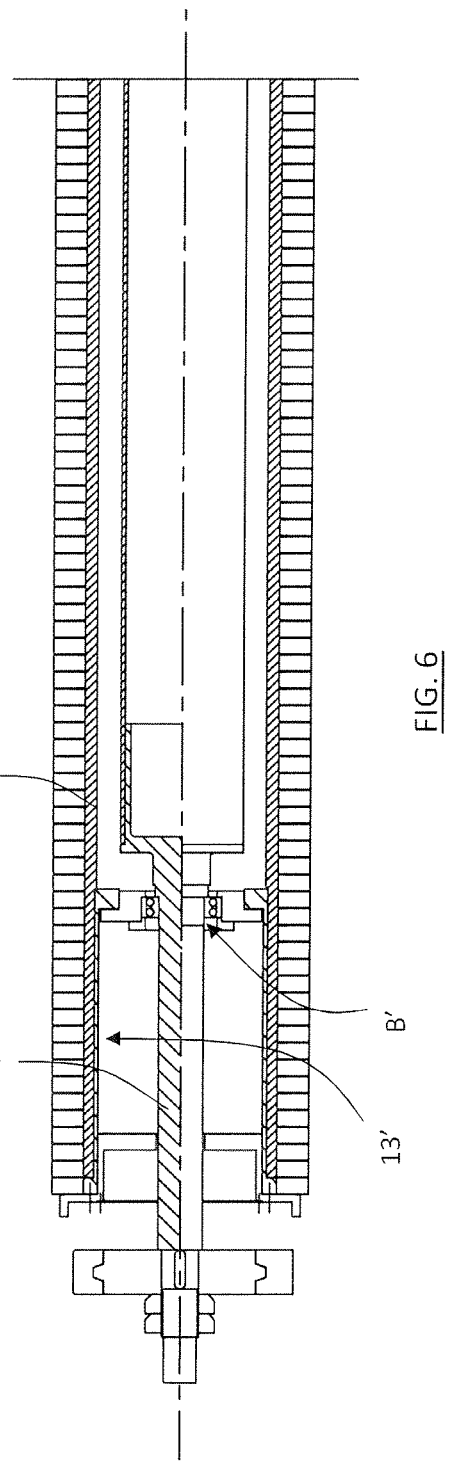

PRESSING ROLLER FOR THE PROCESSING OF WEB PAPER MATERIAL

CROSS-REFRERENCE TO RELATED APPLICATIONS

The instant application is a national phase of PCT International Application No. PCT/IB2017/051885, filed Apr. 3, 2017, and claims priority to Italian Patent Application Serial No. 102016000042297, filed Apr. 26, 2016, the entire specifications of both of which are expressly incorporated herein by reference.

TECHNICAL FIELD

The present invention relates to a pressing roller of the type used in the machineries for the processing of web paper material, in particular in the production process of towel paper.

BACKGROUND ART

In the production sector of kitchen towels rolls of tissue paper are now established two different double embossing contrasted processes with lamination of the plies that have had moments of greater or worse success over the years: these are the NESTED method, in which the tips of one of the two plies lurk between the tips of the other ply, and the TIP/TIP method, in which the tips of a ply are glued against the other ply tips, both well known to the sector's operators.

To date, the NESTED method is undoubtedly the most widespread and almost universally used for the production of kitchen paper rolls. This method allows a very simple machining without problems of rollers duration, of rollers temperatures, of weaknesses in the contact between the latter.

A conventional type of machinery for the production of two-ply embossed towel paper rolls with NESTED technology is schematically shown in FIG. 1. In this, a first, V1, and a second ply of tissue paper, V2, are dragged by a group of rollers which perform the embossing, the pairing and the bonding of the two plies. More specifically, each ply crosses a relative deflection roller, R1, R2, a relative contrast roller, C1, C2, and a relative engraving roller, G1, G2, the interaction between which perform the NESTED pairing of the two plies V1 and V2. In correspondence of a first engraving roller G1 it is present a group of application of the glue comprising a glue tank, S, in which catches a buffer roller, T, which transfers the glue to an applicator roller, A, which applies the glue on the surface of the first ply V1. Before leaving the first engraving roller G1 the two paired paper plies are pressed one against the other by a pressing roller, P, which acts against the first engraving roller G1 to allow the glue to bind together the two plies before leaving the machinery through a further deflection roller, R3.

This type of conventional machinery, however, presents a universally known problem with which manufacturers are willing to live, given the operational advantages that this offers compared to the TIP/TIP method: the two sides of the laminated two-ply paper that is obtained have a different "feel" because one is perfectly smooth (because housed in the engraving roller) while the other is rougher because "double embossed" by the action of the pressing roller P (known in the industry as Marrying Roll) which presses the second ply V2 on the tips of the engraving roller G1 to allow the bonding. This defect is also clearly visible because while one face presents the decoration very clearly impressed by the embossing, the other presents a very confusing look and often it is not possible to perceive the embossing pattern of the roller that generated it because it is confused with the double embossing of the first roller G1. In the detail of FIG. 1, which represents an enlarged view of a paper portion output from the pressing roller, it is possible to observe how the side in contact with the pressing roller P itself has the aforesaid roughness effect due to the decomposition into at least two flat surfaces, S1, S2, on two different levels.

This problem has been repeatedly addressed over times with various attempts of solution.

A type of pressing roller P initially used was made of steel. The extremely hard surface allowed to avoid the effect of double embossing and however it was extremely difficult to obtain a uniform contact over the entire width of the ply because they arose big problems of pressure and bending of the rollers as it was necessary that the pressure of the pressing roller P against the engraving roller G1 was extremely high so that the rollers themselves were extremely robust in order to avoid the bending, with very high production costs and dragging difficulties because of the few tips in contact as well as with an enormous difficulty having a uniform contact along the entire width of the ply. To overcome this problem, a conventional type of pressing roller P involves the use of a steel roller with a rubber cover. Subsequently, in order to avoid the effect of double embossing caused by the yielding of the rubber, this rubber cover has been raised to levels of hardness rather high such as 70 SHA and again after this coverage was improved by adopting a double layer of rubber, a softer inside and a harder outside. This way, it was sought to reduce the effect of double embossing due to the superficial yielding of the rubber without, however, preventing the overall yielding of the roller surface and its deformability necessary in order to properly adjust the bonding pressure and to determine the correct nip. However, this solution has proved to be inefficient due to the impossibility to find the kinds of rubbers to be paired making it possible to obtain the desired elastic response characteristics of the roller and of its surface.

In all the above said solutions the pressing roller P requires a structure such as to be able to contrast the bending of the rollers involved in the process, but this structure involves a weight and a significant inertia which contrast the dragging of the roller itself by the engraving roller; for this reason, even if the value of the pressure required to pair the two plies may be relatively low, it is actually necessary to force much more the contact between the rollers to ensure the rotation start of the pressing roller P, which is one of the double embossing causes.

To overcome this problem they have also been proposed pressing roller provided with convex or concave outer surface to compensate the bending but this imposes the necessity to operate always with the same pressures between the various rollers to obtain a uniform bonding over the entire width of the paper.

In the field of handling of paper or other material they are conventionally known dragging wheels which are made, or superficially coated, with rubber material or other plastic material having certain hardness and flexibility characteristics, in which a good deformability is obtained thanks to a particular constructive geometry. Dragging wheels of this type are described for example in British Patent GB 1205097A and in the European patent application EP 2803610 A1 and comprise a metal tubular core on which it is integrally mounted a rubber coating material of thickness high enough to allow to obtain in said thickness a series of axial cavities arranged radially inclined. The rubber material coating has a very high deformability allowed by the particular "lightened" geometry of the coating itself in which the separation septa between successive cavities are elastic elements that allow a high deformability of the surface. Wheels of this type have conventionally the very outer diameter greater than the axial width and are used to support and move the advancing of paper material or the like in a configuration in which a plurality of the above said wheels with axial width much smaller than the width of the tape to be supported are arranged coaxially spaced apart by a certain entity.

SUMMARY OF THE INVENTION

Object of the present invention is to propose a pressing roller for the treatment of web paper material which is able to overcome the limitations exposed above of the pressing rollers used in the prior art machineries.

A specific object of the present invention is to propose a pressing roller with great surface hardness but with elastic yielding that can be defined depending on the application needs.

Another specific object of the present invention is to propose a pressing roller which, used in machineries and processes for the production of embossed towel paper in accordance with the NESTED method, eliminates the problem of double embossing that conventionally occurs during the transition through conventional pressing rollers.

Another specific object of the present invention is to propose a pressing roller for the treatment of web paper material with extremely low weight compared to conventional pressing rollers in order to facilitate its dragging.

Another object of the present invention is to propose a process for the realization of two-ply embossed paper with NESTED type pairing which avoids the problem of double embossing of the paper using low cost machineries compared to the conventional ones.

The above objects are achieved by means of a pressing roller for the processing of web paper material, in particular of the type used in cooperation with an engraving roller for bonding two or more embossed plies of web paper material, the above said pressing roller comprising a cylindrical pressure surface made of rubber material associated externally in rotatably fixed mode to a cylindrical body mounted to rotate around its axis, with said cylindrical pressure surface defined by the outer surface of a plurality of annular resilient pressure elements arranged one next to the other in the axial direction, each of said annular resilient pressure elements being constituted by an annular body of rubber material comprising an external pressure ring whose outer surface defines an axial portion of the cylindrical pressure surface, an inner ring mounted on the cylindrical body and a plurality of connecting arms arranged and dimensioned for elastically connecting the inner ring with the outer ring.

The pressing roller outlined above has a pressure surface with hardness determined by the rubber material hardness (which may also be of the highest achievable value) in which are made the annular resilient pressure bodies and an elastic yielding that is instead determined by the geometry of the same which can be designed to obtain a relatively extended nip without having to apply high contact pressures between the pressing roller and the engraving roller. In addition, the pressure surface is continuous but each axial portion is elastically yielding independently from the others so that rollers bending or possible mounting inaccuracies can be easily retrieved.

Advantageously the connecting arms are arranged inclined with respect to the radial direction. In addition, each annular resilient pressure element is mounted angularly offset with respect to the adjacent ones by a same entity in such a way as to achieve a substantially uniform elastic yielding of the cylindrical pressure surface.

Still advantageously, the cylindrical body comprises a cylindrical tubular element externally coaxially associated to two supporting bodies with rotatable ends.

DESCRIPTION OF DRAWINGS

These and other advantages and characteristics associated with the pressing roller of the present invention, will become, however, more easily understood through the illustration of constructional non-limiting examples, as described below with the aid of the enclosed drawings, in which:

FIG. 3 represents a schematic side sectional view of an axial end portion of a roller according to the present invention;

FIG. 6 represents, in a sectional view similar to that of FIG. 3, a different embodiment of a pressing roller according to the present invention.

DETAILED DESCRIPTION OF PREFERRED EMBODIMENTS

Figure 1:
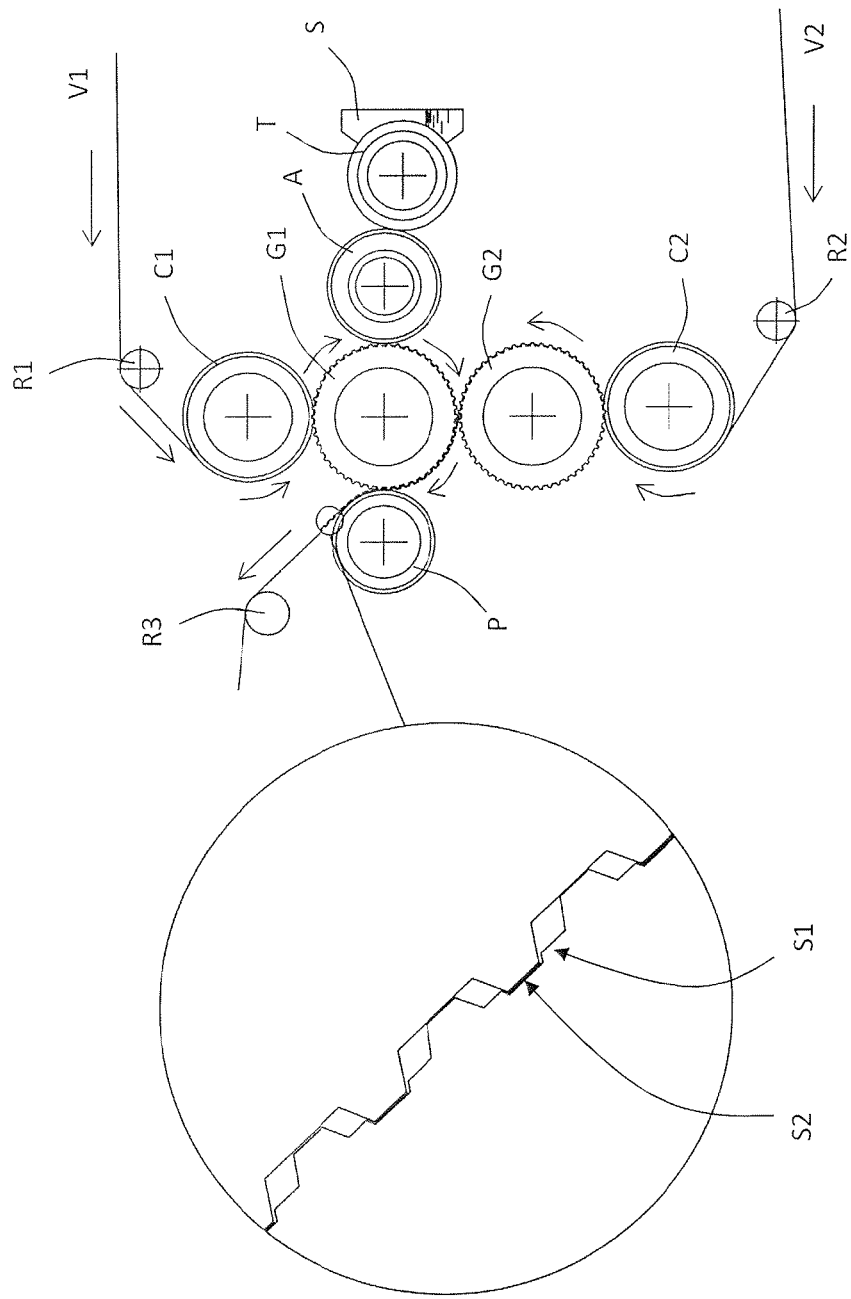
FIG. 1 schematically represents a group for the realization of two-ply paper products embossed and laminated according to the NESTED method with pressing roller of the conventional type.

With reference to FIGS. from 3 to 5 it is shown a pressing roller, 10, according to the present invention, which comprises a cylindrical pressure surface, 11.

The pressing roller 10 comprises a cylindrical tubular element, 12, extending axially for the entire axial length of the pressing roller 10, mounted coaxially, in rotatably fixed mode, outside two revolving end support bodies, 13 (of which is shown in FIG. 3 only the one on the left end of the pressing roller 10). In the embodiment of FIG. 3 each revolving end support bodies 13 is composed of a tubular portion, 13a, to the outer surface of which is associated the cylindrical tubular element 12 and a solid shaft portion, 13b, one end of which protrudes axially from the cylindrical tubular element 12 and is arranged to be rotatably supported by support members, N, through the interposition of rolling bearings, B.

The cylindrical pressure surface 11 is defined by the outer surface of a plurality of annular resilient pressure elements, 15, arranged one next to the another in the axial direction, coaxially mounted on the outer surface of the cylindrical tubular element 12 in rotatably fixed mode.

Each annular resilient pressure element 15 is made in a single body made of rubber material with hardness superior to 90 ShA and preferably close to the maximum obtainable value equal to 98 ShA and comprises an external pressure ring, 16, whose outer surface defines an axial portion of the cylindrical pressure surface 11, an inner ring, 18, mounted on the cylindrical tubular element 12 of the cylindrical body and a plurality of connecting arms, 19, arranged and dimensioned to elastically connect the inner ring 18 with the external pressure ring 16.

The connecting arms 19 are arranged inclined with respect to the radial direction and form separation septa between a plurality of axial cavities, 20, made between the inner ring 18 and the external pressure ring 16. Together with the characteristics of the rubber material with which it is realized the annular resilient pressure element 15, the size of the cavities 20 and of the connecting arms 19 and the inclination of the latter define the elastic yielding properties of the portion of the cylindrical pressure surface 11 defined by the annular resilient pressure element 15 itself.

Figure 5:
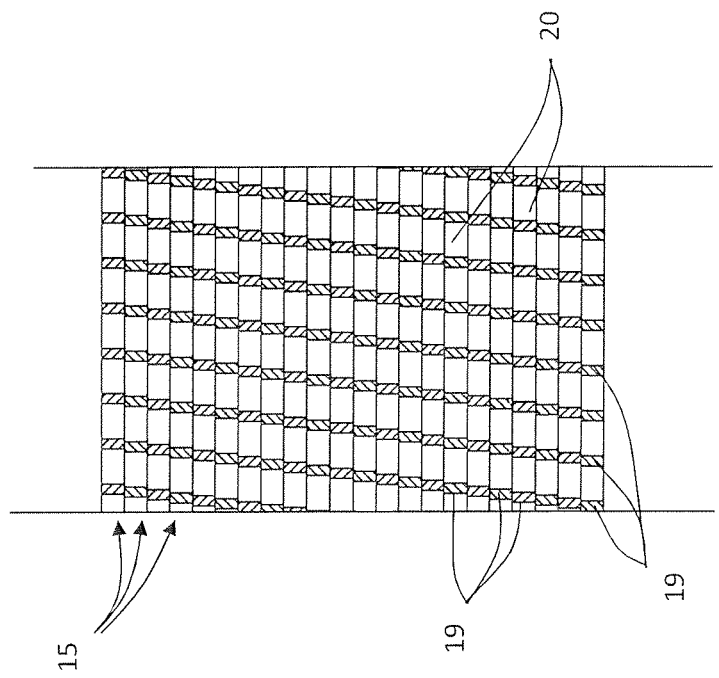
FIG. 5 represents a schematic sectional view made according to the V-V line of FIG. 4.
Figure 4:
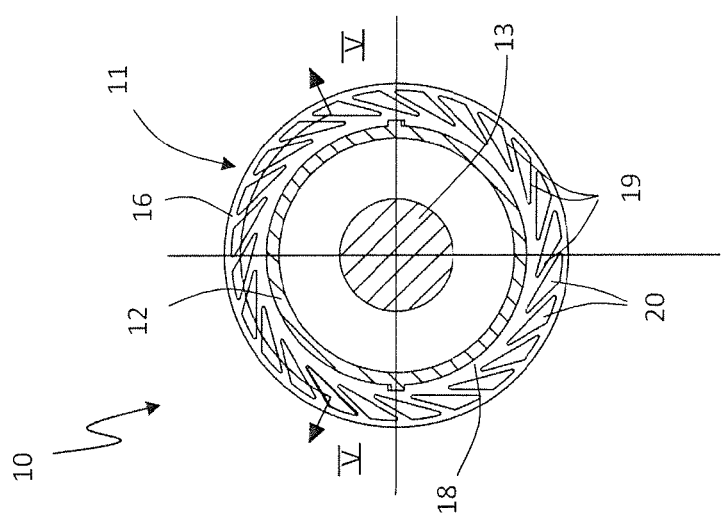
FIG. 4 represents a sectional view made according to the IV-IV line of FIG. 3.

As can be seen from the schematic section of FIG. 5, each annular resilient pressure element 15 is mounted angularly offset with respect to adjacent ones by a same entity so as to provide a substantially uniform elastic yielding of the cylindrical pressure surface 11.

Figure 2:
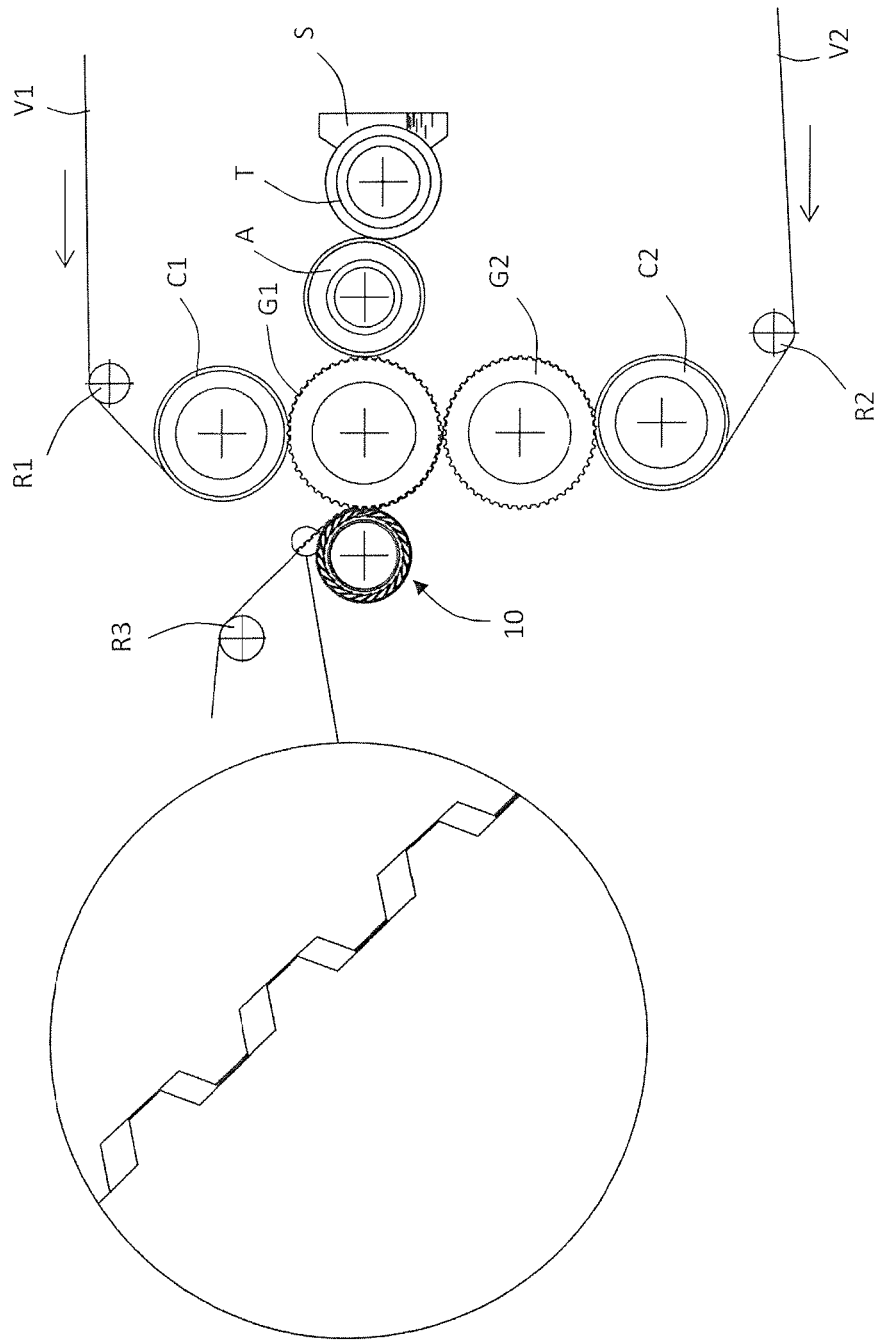
FIG. 2 represents a group for the realization of two-ply embossed paper products similar to the previous one, but comprising a pressing roller according to the present invention.

With reference to FIG. 2, the pressing roller 10 above described is advantageously used in a process for the realization of two-ply embossed paper with NESTED pairing type in which a first, V1, and a second ply of tissue paper, V2, are dragged by a group of rollers which perform the embossing, the pairing and the bonding of the two plies. More specifically, each ply crosses a relative deflection roller, R1, R2, a relative contrast roller, C1, C2, and a respective engraving roller, G1, G2, provided with an embossed surface pattern, the interaction among which performs the NESTED pairing of the two plies V1 and V2. In correspondence of a first engraving roller G1 is present a group of application of the glue comprising a glue tank, S, in which catches a roller buffer, T, which transfers the glue to an applicator roller, A, which applies the glue on the surface of the first ply V1. Before leaving the first engraving roller G1 the two paired paper plies are pressed one against the other by the pressing roller 10 of the invention which acts against the first engraving roller G1 itself to allow the glue to fasten together the two plies before exiting the machinery through a further deflection roller, R3.

Compared to the conventional pressing rollers, the use of the pressing roller 10 according to the invention allows to completely avoid the effect of double embossing, as shown in the detail in FIG. 2, and to obtain an embossed two-ply product in which the two sides are perfectly identical, thanks to the high hardness of the rubber material of which are made the annular resilient pressure elements 15 which define the cylindrical pressure surface 11. Moreover, thanks to the roller lightness and to the elastic yielding of the annular resilient pressure elements 15, the pressure with which it is necessary to press the pressing roller 10 against the engraving roller G1 in order to get a large nip and a good dragging of the roller itself is extremely modest compared to that required with the pressing rollers P of conventional type. Thanks to this, the cylindrical body on which the annular resilient pressure elements 15 can be of extremely simple and lightweight construction because it may not have the characteristics of robustness and flexural rigidity with which the conventional pressure rollers must be equipped to withstand the high pressures of contact.

In fact, the cylindrical tubular element 12 is advantageously made of a lightweight material such as aluminum or carbon fiber and has a relatively small thickness (10-15 mm) in relation to the overall diameter (300-350 mm) of the pressing roller 10 and the total weight of a pressing roller according to the present invention is equal to about ¼ of the weight of a conventional pressing roller made of steel coated with rubber material and even less if made of carbon fiber.

With reference to FIG. 6, an alternative embodiment, 10', yet lighter than a pressing roller according to the invention provides that the cylindrical body in which the cylindrical tubular element 12 is mounted coaxially on the outside of two revolving end support bodies, 13' (which is shown in FIG. 6 only the one on the left end of the pressing roller 10'). In the embodiment of FIG. 6 each revolving end support body 13' is rotatably mounted, with the interposition of rolling bearings, B', on a fixed shaft, 14', one end of which protrudes axially from the cylindrical tubular element 12 and is arranged to be supported in rotatably fixed mode by support members, N. This type of construction of the cylindrical body is slightly more complex and therefore expensive, but it allows to make it overall even lighter a pressing roller according to the present invention.

Certainly, in addition to the above, many other embodiments of a pressing roller for the processing of web paper material according to the present invention can be realized in application of the inventive concept of the present invention, remaining within the implementation scope of the inventive idea above described and within the protection context defined by the following claims.

In fact, the above description of specific embodiments is useful to illustrate the invention core concept, in such a way that experts in the field may implement it modifying and adapting to the various applications the above said embodiments; such adaptations and modifications will therefore be considered as equivalent to the embodiments exemplified. It is understood that the phraseology or numbering has been used purely for descriptive purposes and as an aid for understanding the inventive concept and therefore is not limiting.

The invention claimed is:

1. A pressing roller for the processing of web paper material of the type used in cooperation with an engraving roller for bonding two or more embossed plies of web paper material, comprising:
   a cylindrical pressure surface made of rubber material associated externally in rotatably fixed mode to a cylindrical body mounted to rotate about its axis;
   wherein the cylindrical pressure surface is defined by an outer surface of a plurality of annular resilient pressure elements arranged one next to the other in an axial direction;
   wherein each of the annular resilient pressure elements being constituted by an annular body of rubber material comprising an external pressure ring whose outer surface defines an axial portion of the cylindrical pressure surface, an inner ring mounted on a cylindrical body, and a plurality of connecting arms arranged and dimensioned for elastically connecting the inner ring with the external pressure ring.

2. The pressing roller for the processing of web paper material according to claim 1, wherein the connecting arms are arranged inclined with respect to a radial direction.

3. The pressing roller for the processing of web paper material according to claim 1, wherein each of the annular resilient pressure elements is mounted angularly offset with respect to adjacent annular resilient pressure elements so as to provide an elastic yielding of the cylindrical pressure surface that is substantially uniform.

4. The pressing roller for the processing of web paper material according to claim 1, wherein the cylindrical body includes a cylindrical tubular element associated externally coaxially to first and second revolving end support bodies.

5. The pressing roller for the processing of web paper material according to claim 4, wherein the cylindrical tubular element is made of lightweight material such as aluminum or carbon fiber.

6. The pressing roller for the processing of web paper material according to claim 1, wherein the annular resilient pressure elements are made of rubber material having a hardness greater than 90 ShA.

7. A process for the assembly of two-ply embossed paper of a NESTED type pairing in which a first ply and a second ply of tissue paper are each dragged between first and second contrast rollers and a first and second engraving rollers, each provided with an embossed surface pattern that carries out the embossing of each of the two plies, which are subsequently dragged between the first and second engraving rollers, wherein the interaction between which performs the NESTED pairing of the two plies, in correspondence of the first engraving roller being operable to apply glue on a surface of the first ply, before departing from the first engraving roller, wherein the two plies of paired paper are pressed one against the other by a pressing roller which acts against the first engraving roller, to allow the glue to adhere the two plies together, wherein the pressing roller is a pressing roller according to claim 1.

* * * * *